(Model.)
T. W. LANIER.
BOILER FOR THE MANUFACTURE OF SUGAR AND SIRUP.
No. 244,999.           Patented Aug. 2, 1881.
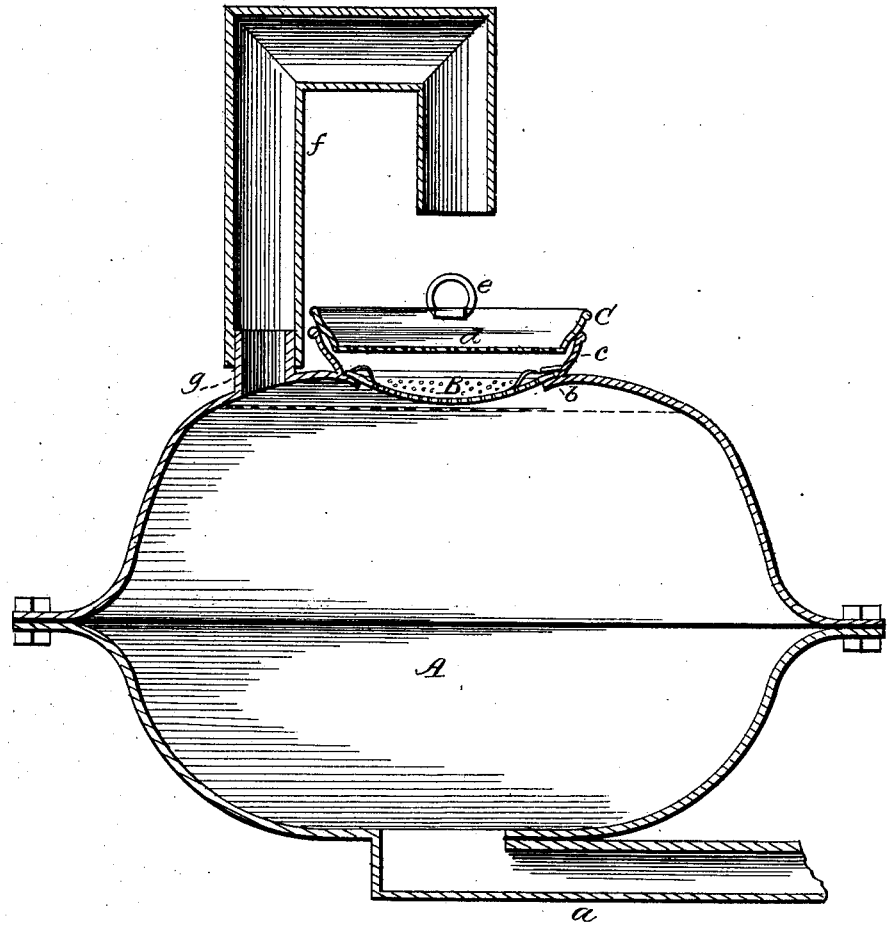
Witnesses:
H. C. McArthur
W. R. Keyworth
Inventor
Thomas W. Lanier,
per Chas. H. Fowler,
Attorney.

United States Patent Office.

THOMAS W. LANIER, OF OLIVER, GEORGIA.

BOILER FOR THE MANUFACTURE OF SUGAR AND SIRUP.

SPECIFICATION forming part of Letters Patent No. 244,999, dated August 2, 1881.

Application filed May 31, 1881. (Model.)

*To all whom it may concern:*

Be it known that I, THOMAS WASHINGTON LANIER, a citizen of the United States, residing at Oliver, in the county of Scriven and State of Georgia, have invented certain new and useful Improvements in Boilers for the Manufacture of Sugar and Sirup; and I do hereby declare that the following is a full, clear, and exact description of the same, reference being had to the annexed drawing, making a part of this specification, and to the letters and figures of reference marked thereon.

The present invention has relation to certain new and useful improvements in boilers for the manufacture of sugar and sirup, and the object thereof is to provide a device of the above character that will strain the juice, take off the scum, and cool, without the necessity of resorting to the ordinary hand-process of cooling, thereby requiring less labor and expense and improving the quality of sirup. These objects I attain by the construction substantially as shown in the drawing and hereinafter described.

The figure in the drawing represents a vertical section.

In the accompanying drawing, A represents the ordinary sugar-boiler having at its bottom a pipe, $a$, through which the sugar or sirup is let out when properly cooked. This boiler may be made in two sections, as shown, each of which has annular flanges for bolting the sections together, a suitable packing-ring being inserted between the flanges to form a tight joint; or, if desired, the boiler may be constructed whole or without forming it in sections. The pipe or spout $a$ may be formed with threads and screwed into a short elbow cast in the bottom of the boiler, or made separate and afterward bolted thereto, a hole being drilled or otherwise made in the bottom of said boiler to register with the hole in the elbow.

By the construction above set forth the top or upper section of the boiler, also the pipe and elbow, can be used with the old-fashion boiler. I do not, however, desire to be understood as confining my invention to the construction shown and described, as it may be variously modified, as found desirable.

The boiler A, which, as previously stated, may be cast in one piece or made in sections, is formed at its top with a circular flange, $b$, and rim $c$, around an opening in the top of said boiler.

Upon the flange $b$ rests a perforated concave dish, B, which prevents the juice from boiling over, and through which the juice is returned into boiler during the boiling process, the dish B being held securely in place by any desirable means, and at the same time admitting of its ready removal when necessary.

Upon the rim $c$ rests a pan, C, provided with a perforated bottom, $d$, or a bottom formed of wire-gauze, as deemed preferable. This pan C, which I shall term a "scum-pan," is provided with suitable handles $e$ for lifting it off and replacing it. The bottom of the pan C is some little distance from the dish B, so that in the boiling process the juice, scum, &c., first fall into the pan C, where the scum is retained, the juice passing on through the perforated bottom $d$ and dish B, back into the boiler. When the pan C is filled with scum it is removed and emptied.

A pipe, $f$, is connected in any suitable manner to the upper portion of the boiler, said pipe being of any desirable shape, so that its end extends up and is located over the pan C, to conduct the juice, scum, &c., as they boil up into the pipe to the pan, from whence the juice passes back into the boiler, as previously described.

In the process of manufacturing sugar and sirup the boiler A is filled with juice to the height represented by dotted line. This leaves a space all around the boiler-top, above the dotted line and on a line with the lower opening or mouth of the short pipe-section $g$, which is cast with the upper section of the boiler. The space above described gives room for the scum to accumulate while heating and before boiling, and, as soon as the juice is brought to a boil, the scum, being very light, finds an outlet with the juice through the pipe $f$, and passes from thence into the pan C, where it is retained, while the juice passes through the perforations in the bottom $d$ and down through the perforated dish B into the boiler, thereby relieving the juice of all scum and trash and at the same time cooling and cleansing it.

The holes in the dish B are so very small it is impossible for the scum to get through, and consequently the large amount accumulated would have to find some outlet when the juice is brought to a boiling-point, and consequently would pass up through the pipe $f$ as it floats upon the surface, and necessarily would be the first thrown off.

The pan C is of sufficient depth to hold the scum without danger of running over, it being emptied when required, and the accumulation of the scum and trash upon the under side of the dish B renders it necessary that it be cleaned occasionally, so that the perforations therein will admit of the free passage of the juice through them. For this purpose the dish is made detachable and removable, it being held, when in place upon the flange $b$, by suitable fastenings.

The boiler A, it should be understood, is not like the ordinary open ones, but closed, as shown, whereby the juice is not exposed to open evaporation.

Having now fully described my invention, what I claim as new, and desire to secure by Letters Patent, is—

1. The combination, with the boiler A, having suitable pipes, $a\ f$, of the removable perforated dish B and removable scum-pan C, substantially as and for the purpose set forth.

2. The boiler A, provided with pipes $a\ f$, flange $b$, and rim $c$, in combination with the perforated dish B and scum-pan C, substantially as and for the purpose specified.

In testimony that I claim the above I have hereunto subscribed my name in the presence of two witnesses.

THOMAS WASHINGTON LANIER.

Witnesses:
 J. J. SAXON,
 R. O. LOVETT.